United States Patent [19]

Tamura et al.

[11] Patent Number: 4,879,657

[45] Date of Patent: Nov. 7, 1989

[54] SYSTEM AND METHOD FOR ELECTRONICALLY CONTROLLING A VEHICULAR ENGINE OPERATION HAVING A SAFE FUNCTION

[75] Inventors: Minoru Tamura, Kanagawa; Shinji Katayose, Tokyo; Terukiyo Murakami; Hisashi Izumi, both of Kanagawa, all of Japan

[73] Assignee: Nissan Motor Company, Limited, Yokohama, Japan

[21] Appl. No.: 169,500

[22] Filed: Mar. 17, 1988

[30] Foreign Application Priority Data

Mar. 26, 1987 [JP] Japan .................... 62-72676

[51] Int. Cl.$^4$ ................ B60K 31/02; F02D 41/26
[52] U.S. Cl. .................... 364/431.07; 123/399; 180/170; 364/426.04
[58] Field of Search ............... 364/431.07, 426.04; 123/352, 396; 180/170, 178, 197

[56] References Cited

U.S. PATENT DOCUMENTS

| | | | |
|---|---|---|---|
| 3,708,031 | 1/1973 | Jania et al. | 180/178 |
| 4,304,202 | 12/1981 | Schofield | 123/350 |
| 4,519,360 | 5/1985 | Murakami | 123/399 |
| 4,519,361 | 5/1985 | Murakami | 123/399 |
| 4,541,052 | 9/1985 | McCulloch | 364/431.07 |
| 4,612,615 | 9/1986 | Murakami | 364/431.07 |
| 4,641,622 | 2/1987 | Murakami | 123/479 |
| 4,649,880 | 3/1987 | Asano et al. | 123/399 |
| 4,671,235 | 6/1987 | Hosaka | 123/352 |
| 4,671,373 | 6/1987 | Sigl | 180/197 |
| 4,691,676 | 9/1987 | Kikuchi | 123/399 |
| 4,707,792 | 11/1987 | Naitou | 123/352 |
| 4,718,380 | 1/1988 | Katayose et al. | 123/399 |
| 4,729,104 | 3/1988 | Hara | 364/426 |
| 4,735,183 | 4/1988 | Inoue et al. | 123/399 |
| 4,736,814 | 4/1988 | Yogo et al. | 123/352 |
| 4,745,985 | 5/1988 | Nakayama et al. | 180/142 |
| 4,756,378 | 7/1988 | Takei | 180/179 |

FOREIGN PATENT DOCUMENTS

| | | | |
|---|---|---|---|
| 0174662 | 3/1986 | European Pat. Off. | 180/170 |
| 51-31915 | 9/1976 | Japan . | |
| 59-190440 | 10/1984 | Japan . | |
| 61-46725 | 3/1986 | Japan . | |
| 61-247829 | 11/1986 | Japan . | |
| 61-247830 | 11/1986 | Japan . | |
| 61-247831 | 11/1986 | Japan . | |
| 2068456 | 8/1981 | United Kingdom | 123/396 |
| 2144179 | 2/1985 | United Kingdom | 180/170 |
| 2191540 | 12/1987 | United Kingdom | 180/175 |

Primary Examiner—Felix D. Gruber
Attorney, Agent, or Firm—Foley & Lardner, Schwartz, Jeffery, Schwaab, Mack, Blumenthal & Evans

[57] ABSTRACT

A system and method for electronically controlling a vehicular engine operation in accordance with an accelerator operation which can utilize a system for automatically controlling a vehicle speed to a set cruising speed are disclosed in which an operating variable selection mechanism which selects and outputs one of operating variables whose value is larger than the other operating variable, the operating variables being derived from an accelerator and from an actuator of the automatic vehicle cruise controlling system is installed. The selected operating variable of the operating variable selection mechanism is detected by means of an accelerator sensor. A throttle actuator is controlled for driving the throttle valve toward the direction in which an opening angle of the throttle valve coincides with a target opening angle which is defined by a detected variable of the accelerator sensor. A limiter provided for limiting a maximum opening angle of the throttle valve is driven by means of a limiter driving mechanism toward the angular position of the throttle valve corresponding to the selected operating variable of the operating variable selection mechanism and is held thereat against the driving force of the throttle actuator by means of a limiter holding mechanism.

30 Claims, 6 Drawing Sheets

//4,879,657

SYSTEM AND METHOD FOR ELECTRONICALLY CONTROLLING A VEHICULAR ENGINE OPERATION HAVING A SAFE FUNCTION

BACKGROUND OF THE INVENTION (1) Field of the Invention

The present invention relates to a system and method for electronically controlling an engine operation having a safe function. The present invention relates specifically to the system and method for electronically controlling an opening angle of an engine throttle valve in accordance with operating variables of an accelerator and of a vehicle speed automatically controlling system. More specifically, the present invention relates to the system and method therefor in which a maximum opening angle of the throttle valve is limited so as to prevent an acceleration of the vehicle carried out against an intention of the vehicle driver and which is capable of utilizing the automatic vehicle speed controlling system in the vehicle.

(2) Background of the Art

Various types of the systems for electronically controlling an opening angle of the throttle valve of the vehicular engine in accordance with an operation of an accelerator have already been proposed.

Japanese Patent Applications Unexamined (first) Publications sho 61-46725 published on Mar. 7, 1986, 61-247829 published on Nov. 5, 1986, 61-247830 published on Nov. 5, 1986, 61-247831 published on Nov. 5, 1986 exemplify the previously proposed systems described above. In addition, a Japanese Patent Application Examined (second) Publication sho 51-31915 published on Sept. 9, 1976 exemplifies another one of the previously proposed systems described above.

In the previously proposed systems disclosed in the above-identified Japanese Patent Application Publications, the accelerator and engine throttle valve are not mechanically linked with each other. Then, when an operating variable (an angular displacement) of the accelerator is detected, a throttle actuator constituted by a reversible motor actuates the throttle valve to open or close in accordance with the detected operating variable of the accelerator.

Furthermore, if a failure occurs in a control system installed between the accelerator and the throttle valve, a limiter is installed which limits a maximum opening angle of the throttle valve in a mechanical cooperation with the accelerator so that the throttle valve can be closed in response to a release operation of the accelerator without failure, thus inhibiting an actuation of the throttle valve to open more widely exceeding the limited opening angle. Such a system with the inhibiting function as described above is exemplified by a Japanese Patent Application Unexamined (first) Publication sho 59-190440 published on Oct. 29, 1984.

In the system disclosed in the above-identified Japanese Patent Application Publication sho 59-190440, since the limiter which mechanically cooperates with the accelerator permits the maximum opening angle of the throttle valve to be limited at its opening angle, the throttle valve can be operated forcibly in its closed direction through the accelerator operation by the vehicle driver. Thus, an ensured closure of the throttle valve can be achieved.

However, since in the previously proposed system disclosed in the Japanese Patent Application Publication sho 59-190440 the maximum opening angle of the throttle valve can compulsively be determined only according to the angular displacement of the accelerator, the vehicle in which the previously proposed electronic engine operation system is mounted cannot apply such a system for automatically controlling a vehicle speed to a desired cruising speed without operation of the accelerator thereto. Hence, it is difficult to add the vehicle speed controlling function to the engine operation controlling system of the vehicle.

SUMMARY OF THE INVENTION

It is therefore an object of the present invention to provide a system and method for electronically controlling a vehicular engine operation in accordance with an operation of an accelerator in which an acceleration of the vehicle carried out against an intention of a vehicle driver can be prevented and by means of which a system for automatically controlling a vehicle speed to a desired cruising speed without operation of the accelerator can be utilized in the vehicle.

The above-described object can be achieved by providing a system for controlling a vehicular engine operation, comprising: (a) a first unit for controlling vehicular engine speed adjusting unit in accordance with a first input operating variable of a vehicular accelerator corresponding to a displacement of the engine speed adjusting unit so that the displacement of the vehicular engine speed adjusting unit coincides with a target displacement thereof determined according to the first input operating variable; (b) a second unit for controlling the vehicular engine speed adjusting unit without operation of the accelerator in accordance with a second input operating variable of the displacement of the engine speed adjusting unit corresponding to a set cruising speed; so that a vehicle speed remains at the set crusing speed; and (c) a third unit for limiting a maximum displacement of the engine speed adjusting unit according to one of the first and second input operating variables which is greater in magnitude than the other operating variable.

The above-described object can also be achieved by providing a system for controlling a vehicular engine operation, comprising: (a) a first unit for electronically controlling a vehicular engine driving force adjusting mechanism in accordance with a first operating variable of an engine driving force adjusting parameter of the engine driving force adjusting mechanism derived from an operation of a vehicular accelerator; (b) a second unit for automatically controlling the vehicular engine driving force adjusting mechanism in accordance with a second operating variable of the engine driving force adjusting mechanism in accordance with a second operation variable of the engine driving force adjusting parameter; and (c) a third unit for limiting an increase of the engine driving force adjusting parameter so as to prevent same from exceeding both of the first and second operating variables so as to prevent the engine speed from being increased exceeding a value limited by the first and second operating variables.

The above-described object can also be achieved by providing a system for controlling a vehicular engine operation, comprising: (a) first unit for controlling vehicular engine speed adjusting unit in accordance with a first operating variable of an engine speed adjusting parameter of the engine speed adjusting unit derived from an operation of a vehicular accelerator; (b) second unit for controlling the vehicular engine speed adjusting unit in accordance with a second operating variable of the engine speed adjusting parameter; and (c) third unit for limiting a further increase of the engine speed adjusting parameter exceeding both of the first and second operating parameters so as to prevent the engine speed from being increased exceeding a value limited thereby.

The above-described object can also be achieved by providing a system for controlling a vehicular engine operation, comprising: (a) an operating variable selection mechanism for selecting and outputting one of operating variables whose value is greater in magnitude, the operating variables being derived from an accelerator and derived from an actuator of a vehicle speed automatically controlling system; (b) an accelerator sensor responsive to a command from the operating variable selecting mechanism for detecting the selected operating variable; (c) a throttle actuator for driving a vehicular engine throttle valve to change its annular displacement; (d) a throttle controlling unit for controlling the throttle actuator in a direction in which the opening angle of the throttle valve coincides with a target opening angle determined according to the operating variable detected by the accelerator sensor; (e) a throttle opening angle limiter for limiting a maximum opening angle of the throttle valve; (f) an opening angle limiter driving mechanism responsive to the command from the operating variable selection mechanism for driving the limiter to an angular position corresponding to the selected operating variable by the operating variable selection mechanism; and (g) a limiter holding mechanism for holding the limiter against a driving force of the throttle actuator at the angular position corresponding to the selected operating variable by the operating variable selection mechanism.

The above-described object can be achieved by providing a method for controlling a vehicular engine operation, comprising the steps of: (a) selecting one of a plurality of operating variables which is greater in magnitude than any other operating variables, the operating variables including a first and second operating variables which are derived from a displacement of an accelerator by a vehicle driver and from an automatically vehicle speed cruising controlling system; (b) setting a limiter provided for limiting a maximum opening angle of a vehicular engine throttle valve installed in an intake air passage to an angularly displacable position of the throttle valve corresponding to the selected operating variable; (c) detecting the operating variable selected in the step (a); and (d) actuating the throttle valve to open at a target opening angle determined according to the selected operating variable so that the present opening angle detected in the step (c) coincides with the target opening angle.

DETAILED DESCRIPTION OF THE PREFERRED EMBODIMENTS

Reference will hereinafter be made to the drawings in order to facilitate understanding of the present invention.

FIGS. 1 (A) and 1(B) integrally show a first preferred embodiment of a system for electronically controlling a vehicular engine operation in accordance with an operation according to the present invention.

Figure 1A:
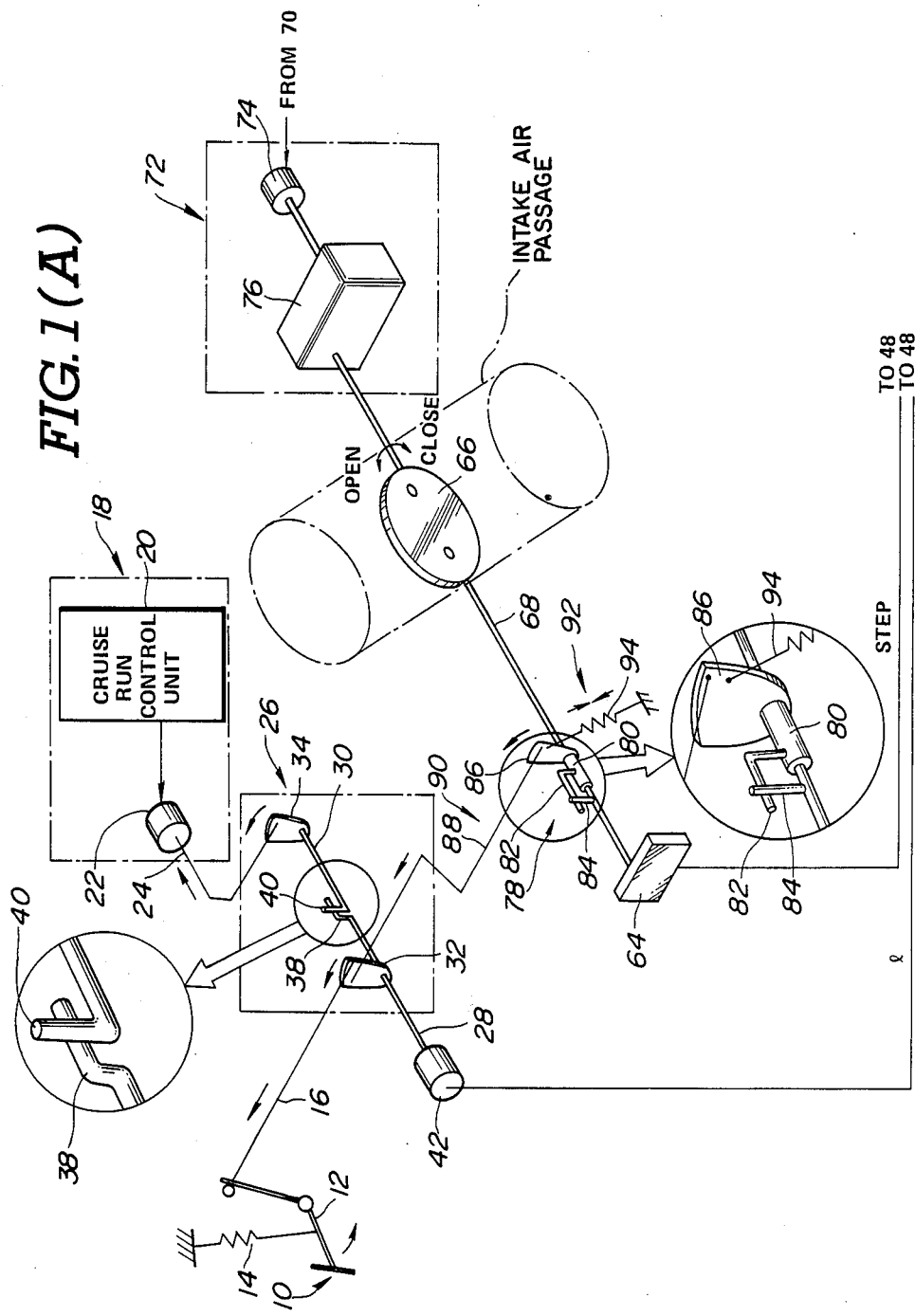
FIGS. 1 (A) and 1 (B) are schematic diagrams of a system for electronically controlling a vehicular engine operation in accordance with an operation of an accelerator in a first preferred embodiment according to the present invention.

In FIGS. 1 (A) and 1 (B), an accelerator pedal 10 (accelerator) is depressed in a counterclockwise direction as viewed from FIG. 1(A). A lever 12 of the accelerator pedal 10 is biased in a clockwise direction by means of an accelerator spring 14. One end of an accelerator wire 16 is connected to an accelerator lever 12. The counterclockwise rotation of the accelerator lever 12 through a depression operation on the accelerator pedal 10 causes the accelerator wire 16 to be drawn toward the lever 12.

A vehicle speed automatically controlling system 18 includes a cruising speed running control unit 20 for carrying out a control of the cruising speed run of the vehicle in response to a cruise command produced by, e.g., a set switch (not shown) and an actuator 22 controlled by means of the unit 20. The actuator 22 draws one end of a control wire 24 to actuate the engine throttle valve 66.

A structure of the vehicle speed automatically controlling system 18 is exemplified by U.S. patent applications Ser. No. 44,053 filed on Apr. 29, 1987 Ser. No. 43,532, filed on Apr. 28, 1987, Ser. No. 55,516 filed on May 29, 1987, Ser. No. 57,086 filed on Jun. 3, 1987, and Ser. No. 109,031, filed on Oct. 16, 1987, the disclosures of which are hereby incorporated by reference.

Furthermore, an operating variable selection mechanism 26 pivotally supports an acceleration axle 28 and vehicle speed controlling axle 30 coaxial with the acceleration axle 28. Lower portions of tongue-shaped drums 32, 34 of the operating variable selection mechanism 26 are fixed respectively on the accelerator axle 28 and vehicle speed controlling axle 30.

In addition, the other end of the accelerator wire 16 is connected to a right corner of an upper portion of the drum 32. One end of the vehicle speed controlling wire 24 is connected to the upper right corner portion of the drum 34.

The other end of the vehicle speed controlling wire 24 is connected to the actuator 22 of the vehicle speed automatically controlling system 18.

Next, a letter L-shaped arm 38 whose tip end extends vertically as viewed from FIG. 1(A) and which is then bent toward the drum 34 in parallel with the accelerator axle 28 is integrally installed on an end surface of the accelerator axle 28 facing toward vehicle speed controlling axle 30. Another arm 40 whose tip end extends vertically in its upper direction as viewed from FIG. 1(A) is integrally installed on the vehicle speed controlling axle 30 facing toward the end surface of the opposite drum 32. An intermediate portion of an arm 40 in contact with a part of the arm 38 causes the part of the arm 38 in parallel with the axles 28 and 30 as shown in FIG. 1(A) to integrally actuate them toward the counterclockwise direction.

Then, the accelerator axle 28 on which the arm 38 is integrally installed is pivoted in the counterclockwise direction as viewed from FIG. 1(A) in response to the depression operation on the accelerator pedal 10 via the drum 32, accelerator wire 16, and accelerator lever 12. The vehicle speed controlling axle 30 on which the arm 40 is installed is pivoted in the counterclockwise direction in response to the drawing operation of the vehicle speed controlling wire 24 toward the actuator.

Hence, in the operating variable selection mechanism 26, both arms 38 and 40 automatically select one of the operating variables, which has a larger value than the other, the two operating variables being a pivotal displacement of the arm 38 due to the drawing operation of the accelerator wire 16 by means of the accelerator pedal 10 and being the pivotal displacement of the arm 40 due to the drawing operation of the actuator 22 of the vehicle speed controlling system 18. Then, the accelerator axle 28 and drum 32 are pivoted to an angular displacement corresponding to the selected operating variable by the selection mechanism 26.

One of the operating variables selected by the operating variable selection mechanism 26 is detected by means of an accelerator sensor 42 via the accelerator axle 28. The detected value l of the angular displacement is supplied to a CPU (Central Processing Unit) 46 installed within the throttle valve controlling system 44 via an A/D (analog-to-digital) converter 48 shown in FIG. 1 (B).

The A/D converter 48 also receives an output voltage of an F/V (Frequency-to-Voltage) converter 50. Detected pulses by means of revolution responsive sensors 52, 54, and 56 representing the number of revolutions are supplied to the F/V converter 50.

The revolution responsive sensor 52 detects the number of revolutions $V_R$ of rear tire wheels 58L and 58R from a differential gear 60. The revolution responsive sensors 54 and 56 detect the number of revolutions $V_{FL}$ and $V_{FR}$ of a forward left wheel 62L and forward right tire wheel 62R, respectively.

The A/D converter 48 furthermore receives the detected voltage of a throttle sensor 64. The throttle sensor 64 detects an opening angle STEP of the throttle valve 66 from a driving axle 68 of the throttle valve 66.

Figure 2:
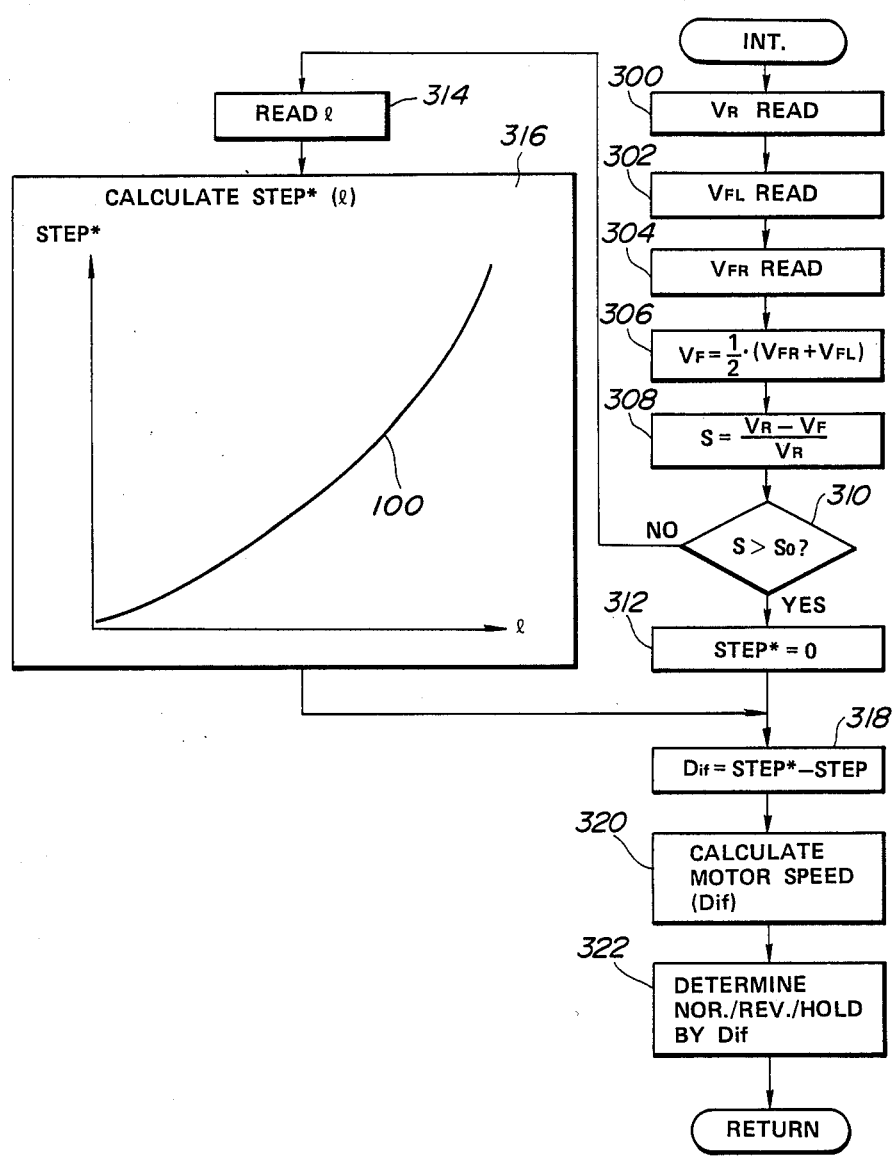
FIG. 2 is a control program flowchart executed in a microcomputer shown in FIGS. 1 (A) and 1 (B).
Figure 3:
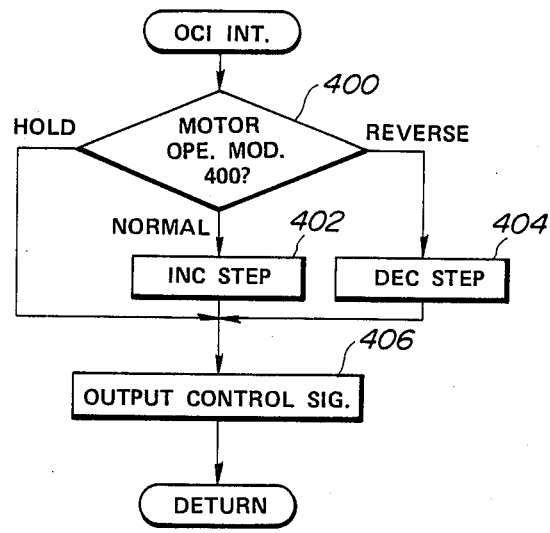
FIG. 3 is another control program executed in the microcomputer shown in FIGS. 1(A) and 1(B).

The CPU 46 carries out the following interrupt processings shown in FIGS. 2 and 3 using the parameters of the detected values l, $V_R$, $V_{FL}$, $V_{FR}$, and STEP.

In FIG. 2, the CPU 46 reads in the detected values of the number of revolutions $V_R$ of the two rear wheels 58L and 58R from the revolution responsive sensor 52, in a step 300.

In the next steps 302 and 304, the CPU 46 reads in the detected values $V_{FL}$ of the number of revolutions of the forward left tire wheel 62L and $V_{FR}$ of the forward right tire wheel 62R, sequentially.

When the detected values $V_F$ of the number of revolutions of the forward wheels 62L and 62R are derived by an average of the detected values $V_{FL}$ and $V_{FR}$ in a step 306, the CPU 46 calculates a slip ratio S between the two rear wheels 58L and 58R by dividing a value of a subtraction of the forward wheel revolution value $V_F$ from the detected value $V_R$ of the rear tire wheel revolution number value by the detected value $V_R$ of the number of revolutions of the rear wheel $((V_F - V_R))$.

In a step 310, the CUP 46 determines whether the slip ratio S exceeds a set slip ratio So. If the slip ratio S exceeds the set slip ratio So in the step 310 (Yes), a target opening angle STEP* of the throttle valve 66 is set to zero in a step 312.

On the other hand, the slip ratio S is below the set slip ratio So in the step 310, the CPU 46 then reads in the detected value l of the selected operating variable described above in a step 314. The target opening angle STEP* of the throttle valve 66 is thereafter derived from a characteristic curve 100 shown in FIG. 2 and stored in a memory MEM using the detected value l in a step 316.

In this way, the target opening angle STEP* of the throttle valve 66 is derived in the steps 312 and 316 and, thereafter, an opening angle deviation Dif is derived by subtracting the actual opening angle STEP from the target opening angle STEP* in a step 318.

Then, a rotational speed and direction of the motor is calculated from the deviation Dif in a step 320. Finally, any one of three modes of operation of the motor 74, i.e., normal revolution, reverse revolution, or holding the speed is determined in a step 322.

On the other hand, in the processing of FIG. 3, the CPU 46 determines whether the motor should be normally rotated, reversely rotated, or held in its rotational position in a step 400. When the motor should be rotated normally or reversely, a control signal indicating the rotation of the motor in the normal direction at the calculated speed is outputted. in steps 402, 404, and 406. (The processing shown in FIG. 3 is also exemplified by a U.S. Pat. No. 4,718,380 issued on Jan. 12, 1988, the disclosure of which is hereby incorporated by reference).

The control signal derived in the way described above is outputted from the CPU 46 to a motor driver 70, the driver 70 actuating the motor 74 in the throttle actuator 72. A driving force produced by the motor 74 is supplied to a reduction gear box 76, the throttle valve 66 being actuated by the reduction gear box 76.

As described above, the throttle valve 66 is closed when a rotation difference between the rear wheels 58L and 58R and forward wheels 62L and 62R exceeds a predetermined value (set slip ratio). If the rotation difference does not exceed the predetermined value, the throttle valve 66 is controlled to open or close according to the detected value l of the acceleration sensor 42 using the characteristic graph 100 shown in FIG. 3.

Figure 1B:
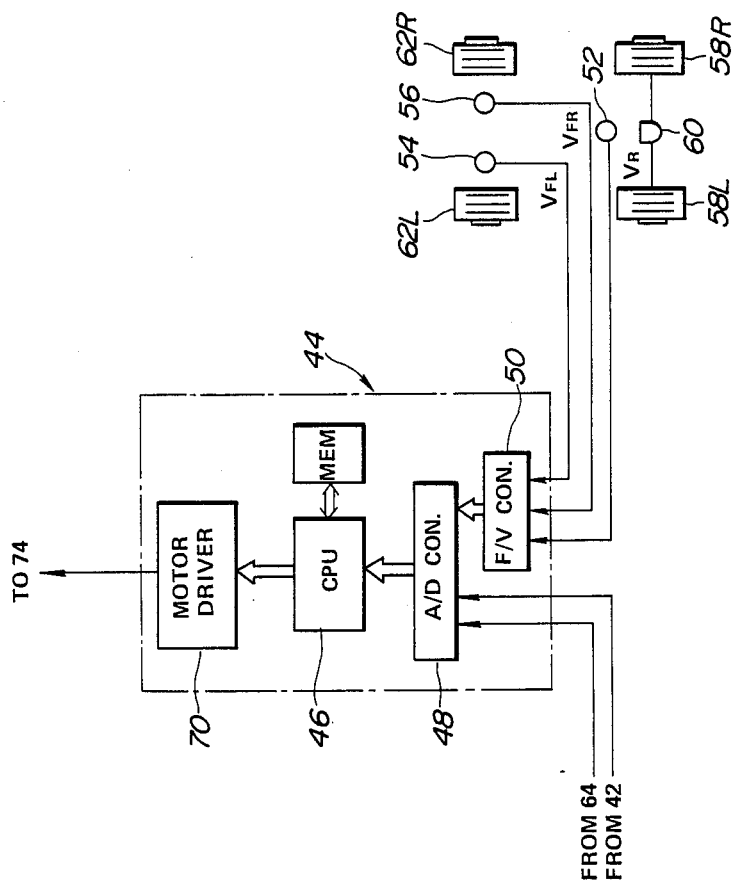

It is noted that in FIGS. 1(A) and 1(B), a limiter 78 is installed on a driving axle 68 of the throttle valve 66 for limiting the opening angle of the throttle valve 66. A maximum opening angle of the throttle valve 66 set by means of a throttle actuator 72 is limited by means of the limiter 78.

As shown in FIGS. 1(A) and 1(B), a pivoting envelope 80 of the limiter 78 is pivotally fitted into the driving axle 68 of the throttle valve 66. An arm 82 whose tip end is bent and extended from the envelop 80 toward the throttle sensor 64 in parallel with the driving axle 68 is integrally installed on an intermediate portion of the pivoting envelope 80.

Furthermore, another arm 84 is extended vertically on the driving axle 68 at a side thereof adjacent to the throttle sensor 64 and brought in contact with the arm 82 of the pivoting envelope 80. An intermediate portion of the arm 84 is thus contacted with the arm 82 to inhibit the throttle valve 66 from being opened through a more wider angle.

A lower portion of a tongue-shaped drum 86 is fixed on the pivoting envelope 80 on which the arm 82 is integrally installed. The throttle wire 88 links the upper right corner of the drum 86 with the upper left corner of the drum 32. A driving mechanism 90 for the limiter 78 is constituted by the drum 86 and throttle wire 88. The arm 82 of the limiter 78 is driven to move with the envelope 80 by means of the driving mechanism 90 toward an angular position corresponding to one of the operating variables l which is larger (winning the race) than the other operating variable selected by the operating variable selecting mechanism 26, the operating variables being those of the accelerator pedal 10 and vehicle speed cruise controlling system 18.

Figure 4:
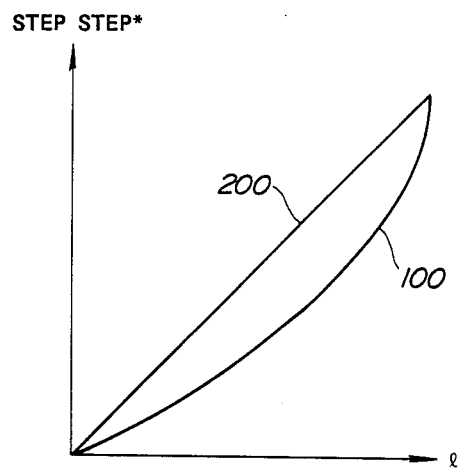
FIG. 4 is a characteristic graph for explaining an operation of opening angle of the throttle valve shown in FIGS. 1(A) and 1(B).

Furthermore, the angular position of the arm 82 defined mechanically exhibits a linear characteristic 200 shown in FIG. 4. The characteristic denoted by 200 shows the value step as being higher than the control characteristic 100 described above with reference to FIG. 4.

In addition, the position of the arm 82 of the limiter 78 is held by means of a limiter holding mechanism 92 against a driving force of the throttle actuator 72 at the angular position corresponding to the selected operating variable (l). A throttle spring 94 is used as the throttle limiter holding mechanism 92.

The throttle spring 94 biases an intermediate right portion of the drum 86 so as to be drawn in the close direction of the throttle valve 66. The biasing force is larger than the driving force of the throttle valve 66 of the throttle actuator 72, but smaller than a force driving the drum 86 via the vehicle speed controlling wire 24, operating variable selecting mechanism 26, and throttle wire 90 by means of the vehicle speed automatically controlling system 18.

An operation of the first preferred embodiment will be described below.

Since the wire 24 linked to the actuator 22 is not drawn by means of the actuator 22 connected to the cruise controlling unit 20 when the vehicle normally runs during the release of the control operation by means of the vehicle speed automatically controlling system 18 and the arm 40 is, at this time, escaped in the clockwise direction from a pivoting angular range of the drum 38, the pivoting angle of the drum 32 in the clockwise direction is determined only from the depression displacement of the accelerator pedal 10. The detected value l of the acceleration sensor 42 corresponds to the depression angular displacement of the accelerator pedal 10.

When there is no rotational difference exceeding the predetermined rotation difference between the rear wheels 58L and 58R and forward wheels 62L and 62R, the target opening angle STEP* of the throttle valve 66 is derived in accordance with the characteristic 100 shown in FIGS. 2 and 4. The opening angle of the throttle valve 66 is controlled by means of the throttle actuator 72 so as to make the actual opening angle STEP coincide with the target opening angle STEP*.

When the slip of tire(s) occurs at the rear tire wheels 58L and 58R due to an abrupt and strong depression on the accelerator pedal 10 in such a case where the vehicle has started, the throttle valve 66 is at once closed in a step 312 shown in FIG. 2. At this time, a driving force transmitted to the rear wheels 58L and 58R from the engine is reduced. Thus, a gripping force of the rear wheels 58L and 58R on a corresponding road surface is recovered so that the driving force will effectively be transmitted onto the road surface on which the rear wheels are placed.

On the other hand, when the vehicle speed controlling system 18 starts its control, the cruise run of the vehicle at a set cruising speed is started without depressing and releasing operations of the accelerator pedal 10 by the driver.

At this time, the accelerator axle 28 and drum 32 are actuated in the counterclockwise direction as viewed from FIG. 1(A) by means of the actuator 22. The opening angle of the throttle valve 66 is controlled by means of the throttle actuator 72 in a direction in which the actual opening angle STEP coincides with the target opening angle STEP* corresponding to the operating variable l detected by the accelerator sensor 42.

If an acceleration of the vehicle which exceeds the target vehicle speed during the cruise speed run owing to, e.g., the necessity to pass ahead of another preceding vehicle, the accelerator pedal 10 needs to be largely depressed. The accelerator pedal 10 causes the drum 32 to be pivoted further in the counterclockwise direction.

The detected value l of the acceleration sensor 42 is accordingly increased by the largely depressed angle on the pedal 10 to open the throttle valve 66.

Hence, the opening angle of the throttle valve 66 is controlled according to the characteristic 100 in accordance with the operation of the accelerator pedal 10 in a speed range exceeding the target vehicle speed during the cruise run. Thus, the vehicle speed is adjusted through the acceleration operation by the driver on the pedal 10.

If an abnormality occurs in the throttle angle electronically controlling system 44 and/or throttle actuator 72 such as malfunctioning of the motor 74 during the run of the vehicles and therefore there is an error operation of the system 44 and/or actuator 72 such as to cause the throttle valve 66 to open excessively, the throttle valve 66 will not be opened through a more wider angle any more in spite of an application of abnormal driving force of the throttle actuator 72 to the throttle valve 66 since the arm 82 of the limiter 78 is already driven to pivot at an angular position corresponding to either one of the operating variables l of the depression angular displacement of the accelerator pedal 10 and the operating variable by means of the actuator 22 in the vehicle speed automatically controlling system 18 which is greater in magnitude than the other operating variable and the arm 82 is held in its angular position by means of the throttle valve 66.

Hence, at an abnormal operation occurrence when the actual opening angle STEP of the throttle valve 66 is immediately transferred to the characteristic 200 from the characteristic 100 in FIG. 4. The abnormality described above is perceived by the driver.

At this time, the accelerator pedal 10 is returned to the non-depression state and/or the cruising speed control is released by means of the driver's brake operation and/or clutch operation.

The throttle valve 66 is forcibly driven in the close direction by means of the arm 82 of the limiter 78 which is mechanically cooperated with the accelerator pedal 10 so that the vehicle speed is consequently reduced.

Thereafter, the accelerator pedal 10 is operated in the same way as the vehicle in which the accelerator pedal 10 and throttle valve 66 is mechanically linked. The opening angle of the throttle valve 60 is controlled in accordance with a depression angular displacement of the accelerator pedal 10 by the driver using the characteristic 200 in FIG. 4.

It is noted that since during the abnormal operation the arm 82 of the throttle opening angle limiter 78 can be actuated by means of the vehicle speed controlling system 18, the cruise speed running can be restarted or continued.

As described hereinabove, according to the present invention, since the limiter 78 which limits the maximum opening angle of the throttle valve 66 is moved toward the angular position corresponding to the one of the operating variables which is greater in magnitude than the other operating variable, such an erroneous operation of the system 44 and/or actuator 72 that the throttle valve 66 is increasingly opened against the intention of the driver due to the failures in the throttle actuator 72 or the throttle controlling system 44 can be prevented. It is noted that the automatic control function of the vehicle cruising speed can be added to the throttle valve electronically controlling system 44.

In addition, in the first preferred embodiment, although the throttle valve 66 is once closed during the slip occurrence of the rear wheels 58L and 58R, the electronic throttle opening angle controlling system 44 can be constituted such that when the engine revolution speed is excessively high, the opening angle of the throttle valve 66 is reduced.

Figure 5:
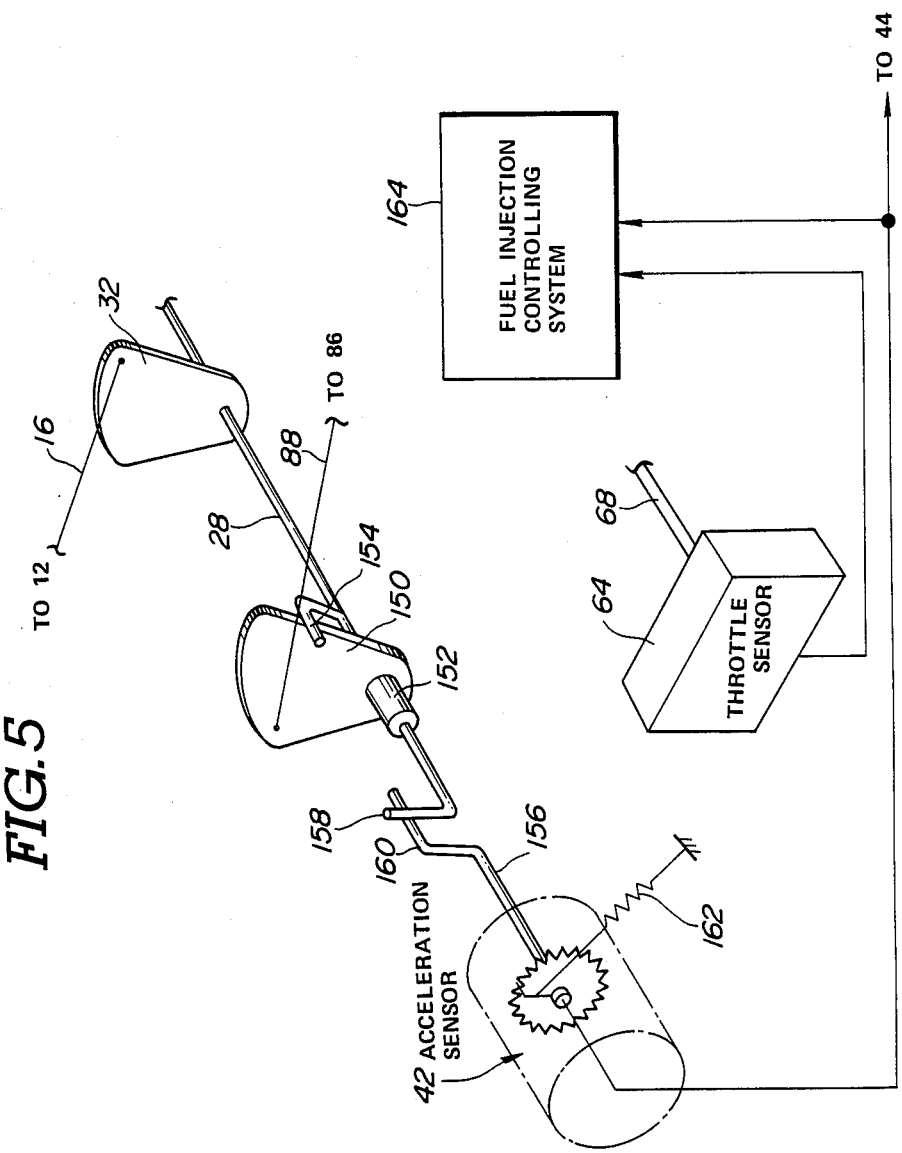
FIG. 5 is a schematic diagram of the vehicular engine operation electronically controlling system in a second preferred embodiment according to the present invention.

FIG. 5 shows an essential part of the second preferred embodiment of the engine operation controlling system according to the present invention.

It is noted that the drum 34 is not connected to the throttle wire 88.

A tongue-shaped drum 150 is disposed on the accelerator axle 28 of the accelerator sensor 42. A pivoting envelope 152 is installed on the lower part of the drum 150.

The pivoting envelope 152 is pivotally supported on the accelerator axle 28 and the throttle wire 88 is connected to an upper left part of the drum 150.

Furthermore, an arm 154 is integrally installed on the accelerator axle 28 and is located on a rear side of the drum 150. The arm 154 is formed in the letter L shape, extending vertically with respect to the acceleration axle 28 and the tip end thereof being extended toward the acceleration sensor 42 in parallel to the acceleration axle 28.

Since the right side surface of the drum 150 is pivoted in the counterclockwise direction with respect to the tip end of the arm 154, the throttle wire 88 is drawn along with the pivotal movement of the accelerator axle 28 in the counterclockwise direction.

The accelerator axle 28 is not directly linked with an input axle 156 of the accelerator sensor 42, an L-shaped arm 158 is integrally installed on the tip end of the axle 28 facing the accelerator sensor 42.

The input axle 156 is coaxial with the accelerator axle 28. Another letter-L shaped arm 160 whose free tip end extends in parallel with the accelerator axle 28 and which is bent vertically and extended toward the drum 150 is disposed with an intermediate portion thereof being brought in contact with the arm 158.

Furthermore, the input axle 156 is biased in the clockwise direction as viewed from FIG. 5 by means of a spring 162 via a movable element of the accelerator sensor 42. A tip end portion of the arm 160 disposed in parallel with the accelerator axle 28 depresses an intermediate portion of a half extended portion of the arm 158.

In addition, the detected values 1 and STEP of the acceleration sensor 42 and throttle sensor 64 are supplied to a fuel injection controlling system 164. the fuel injection controlling system 164 carries out a control of a quantity of fuel injected into the engine and a control of an engine ignition. The fuel injection controlling system is exemplified by U.S. patent application Ser. No. 67,007 filed on June 29, 1987, the disclosure of which is hereby incorporated by reference.

As described above, in the second preferred embodiment, such a mechanism that the selected operating variable which causes the throttle valve 66 to open is transmitted only from the acceleration axle 28 to the limiter 78 but not transmitted in the reverse direction (a swing idle mechanism constituted by the arm 150, pivoting envelope 152, and arm 162) and such a mechanism that the selected operating variable is transmitted only toward the accelerator sensor 42 but not transmitted in the reverse direction (a swing idle mechanism constituted by the arms 158, 160 and the spring 162) are added to the first preferred embodiment described above.

Hence, if the throttle valve 66 remains at a certain open angle due to the occurrence of abnormality such as inoperation of the motor 74 caused by such an excessive heat rise in the motor 74, the acceleration axle 28 can freely be pivoted in accordance with the acceleration operation irrespective of the stopped throttle valve and the input axle 156 of the acceleration sensor 42 is interlocked with the acceleration axle 28. Therefore, a large difference occurs between the detected value 1 of the accelerator sensor 42 and the detected value STEP of the throttle sensor 64. In a case where the input axle 156 of the accelerator sensor 42 fails due to its fixing, the large difference occurs between them.

The monitoring of the above-described abnormality in the motor 74 is carried out by means of the fuel injection controlling system 164. Upon confirmation that the large difference occurs between both detected values 1 and STEP, a fuel cut off and ignition halt are carried out and the vehicle speed is consequently is reduced.

Figure 6:
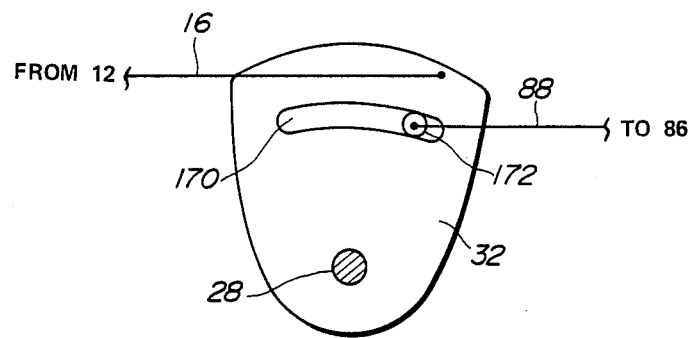
FIG. 6 is a schematic diagram of the vehicular engine operation electronically controlling system in a third preferred embodiment according to the present invention.

FIG. 6 shows a third preferred embodiment of the electronically controlling engine operation system according to the present invention.

Figure 7:
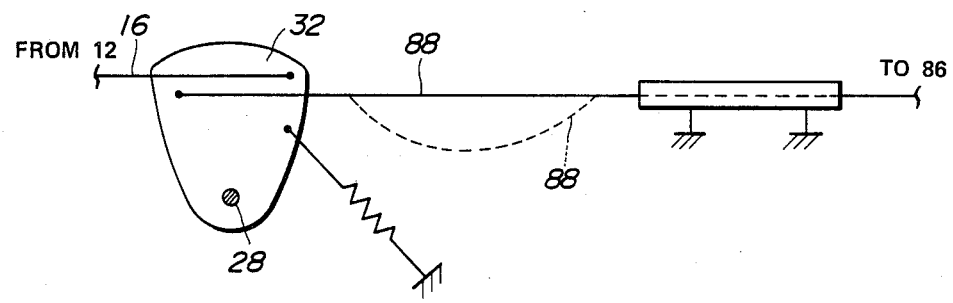
FIG. 7 is a schematic diagram of the vehicular engine operation electronically controlling system in a fourth preferred embodiment according to the present invention.

FIG. 7 shows a fourth preferred embodiment of the engine operation electronically controlling system according to the present invention.

In the third preferred embodiment shown in FIG. 6, a movement element 172 located on the tip end of the throttle wire 88 can freely be moved in an elongated hole 170 formed on the drum 32.

In the fourth preferred embodiment shown in FIG. 7, an inner cable of the throttle wire 88 can be flexed in a mid way of the cable.

The same effects as those achieved in the second preferred embodiment can also achieved in these embodiments.

As described hereinabove, since in the engine operation electronically controlling system according to the present invention the limiter which limits the maximum opening angle of the throttle valve is moved toward an angular position corresponding to one of the operating variables which is larger than the other operating variable, the operating variables being derived from the acceleration operation and derived from the actuator of the vehicle speed controlling system, the erroneous operation of the throttle valve in the open direction due to the abnormality of the throttle controlling system and its actuator can be prevented and the extremely useful vehicle speed automatically controlling function can be added.

It will be appreciated by those skilled in the art that the foregoing description is made in terms of the preferred embodiments and various changes and modifications may be made without departing from the scope of the present invention which is to be defined by the appended claims.

We claim:

1. A system for controlling a vehicular engine operation, comprising:
    (a) first means for electronically controlling a vehicular engine driving force adjusting mechanism associated with the engine in accordance with a first input operating variable of a vehicular accelerator which corresponds to a desired operating variable of the engine driving force adjusting mechanism and for determining a target operating variable according to the first operating variable of the accelerator, so that the operating variable of the engine driving force adjusting mechanism coincides with the target operating variable;
    (b) second means for automatically controlling the operating variable of the engine driving force adjusting mechanism in response to a command to set current vehicle speed to a desired cruise speed without operation of the accelerator so that the operating variable of the engine driving force adjusting mechanism coincides with a second operating variable which corresponds to the set cruise speed and the vehicle speed is maintained at the desired cruise speed; and
    (c) third means for limiting a maximum operating variable of the engine driving force adjusting mechanism according to one of the first and second input operating variables which is greater in magnitude than the other operating variable.

2. A system as set forth in claim 1, wherein the first means comprises:
    (a) fourth means for detecting either of the first and second input operating variables which is greater in magnitude and outputting a first signal indicative thereof;
    (b) fifth means for detecting a slip occurrence of vehicular tire wheels and outputting a second signal indicative thereof;
    (c) sixth means for detecting axial operating variable of the engine driving force adjusting mechanism and outputting a third signal indicative thereof;
    (d) seventh means for deriving the target operating variable of the engine driving force adjustment on the basis of the first, second, and third signals; and
    (e) eighth means for actuating the engine driving force adjusting mechanism so that the actual operating variable of the engine speed adjusting means coincides with the target operating vehicle.

3. A system as set forth in claim 2, wherein the fourth means detects the second input operating variable of the second means when the second means is operating and the accelerator is not operated.

4. A system as set forth in claim 3, wherein the second means incudes ninth means for providing the second input operating variable and wherein the third means includes tenth means for selecting and outputting either one of the first and second operating variables which is greater in magnitude; a limiter for limiting the maximum displacement of the engine driving force adjusting mechanism; eleventh means responsive to the selected operating vehicle by the tenth means for actuating the limiter to a position limiting a maximum operating variable of the engine driving force adjusting mechanism corresponding to the selected operating variable; and twelfth means for holding the limiter at said position against an actuating force derived from the eighth means.

5. A system as set forth in claim 4, wherein the engine driving force adjusting mechanism comprises a throttle valve installed in an intake air passage of the vehicular engine and an operating variable of the throttle valve is an opening angle thereof.

6. A system as set forth in claim 5, wherein the tenth means comprises:
    (a) a first drum linked with the ninth means via a first wire and pivotable according to the second input operating variable provided by the ninth means;
    (b) a first axle one end thereof linked to the first drum, having a first arm integrally extended from the other free end thereof, and pivotable with the first arm;
    (c) a second drum linked with the accelerator via a second wire and pivotable according to the first input variable; and
    (d) a second axle having an intermediate portion thereof linked with the second drum, pivotable with the second drum, and having a second arm integrally extended from one free end thereof, and brought in contact with the first arm, the second drum being linked to the limiter of the third means via a third wire.

7. A method as set forth in claim 6, wherein the fourth means detects the pivotal displacement of the second axle.

8. A system as set forth in claim 6, wherein the eleventh means and limiter comprises: a third arm linked with the second drum via the third wire, pivotable with the second drum, and linked with the twelfth means; a first envelope fixed to the third drum, pivotally supported by an axle of the throttle valve, and having a third arm integrally extended therefrom; and a fourth arm integrally extended from the axle of the throttle valve and brought in contact with the third arm so that the axle of the throttle valve is prevented from being pivoted to open the intake air passage more widely.

9. A system as set forth in claim 8, wherein the twelfth means comprises a spring for biasing the third drum to pivot in a direction at which the throttle valve is closed.

10. A system as set forth in claim 8, wherein the first and second arms are brought in contact with each other in such a way that the first arm is placed at a side such that the throttle valve is opened.

11. A system as set forth in claim 2, wherein the fifth means comprises a first sensor for detecting a first number of revolutions of rear tire wheels of the vehicle; a second sensor for detecting a second number of revolutions of a forward left tire wheel; a third sensor for detecting a third number of revolutions of a forward right tire wheel; ninth means for calculating an average number of revolutions of the forward tire wheels from the second and third numbers of revolutions; tenth means for calculating a slip ratio from the average number of revolutions calculated by the ninth means and the first number of revolutions; and eleventh means for determining whether said slip ratio calculated by the tenth means exceeds a set slip ratio.

12. A system as set forth in claim 11, wherein the sixth means derives the target operating variable of the engine driving force adjusting mechanism as zero when the eleventh means determines that the slip ratio exceeds the set slip ratio.

13. A system as set forth in claim 12, wherein the sixth means derives the target operating variable according to the detected operating variable of the fourth means using a predetermined characteristic when the eleventh means determines that the slip ratio is below the set slip ratio.

14. A system as set forth in claim 13, wherein the eighth means includes a motor and a reduction gear and wherein the eighth means, upon receiving data relating to the actual and target operating variables derives a difference between the actual operating variable and the target operating variable of the engine driving force adjusting mechanism, calculates a speed and rotational direction of the motor according to a result of the difference, and adjusts the engine driving force according to the calculated result of the speed and rotational direction of the motor.

15. A system as set forth in claim 1, wherein the third means actuates the engine driving force adjusting mechanism so that the operating varaiable of the engine driving force adjusting mechanism is zero when the first means fails and causes the engine driving force adjusting mechanism to increase the engine speed.

16. A system as set forth in claim 5, wherein the tenth means comprises:
(a) a first drum linked with the ninth means via a first wire and pivotable according to the second input operating variable;
(b) a first axle one end thereof linked to the first drum, having a first arm integrally extended from the other free end thereof, and pivotable with the first drum;
(c) a second drum linked with the accelerator via a second wire, and pivotable according to the first input variable;
(d) a second axle, an intermediate portion thereof linked with the second drum, having a second arm integrally extended from one end thereof and brought in contact with the first arm, a third arm integrally extended from an intermediate portion thereof, and a fourth arm integrally extended from the other free end thereof;
(e) a third drum linked with the limiter via a third wire, the third arm of the second axle being brought in contact with a portion of the third drum so that only either of the input operating variables to increase the opening angle of the throttle valve is transmitted to the third drum; and
(f) an envelope fixed to the third drum and pivotally supported on the second axle with the third drum.

17. A system as set forth in claim 16, wherein the fourth means includes an axle and movable element linked with one end of the axle and being biased by a biasing element in a direction so as to bring the third drum in contact with the third arm, the other end of the axle having a fifth arm brought in contact with the fourth arm by means of the biasing element, and the fourth means only detects either of the input operating variables which causes the throttle valve to open.

18. A system as set forth in claim 17, which further comprises thirteenth means for monitoring the third signal outputted by the sixth means and the first signal outputted by the fourth means; fourteenth means for determining whether a difference between the detected values of the first and third signals exceeds a predetermined value; and fifteenth means for cutting off a fuel supply of the vehicular engine and halting an ignition in the vehicular engine when the fourteenth means determines that the difference exceeds the predetermined value.

19. A system as set forth in claim 6, wherein the second drum includes an elongated hole at a center portion thereof, the third wire having a stopper at one end thereof linked to the elongated hole so as to move freely along the elongated direction of the hole.

20. A system as set forth in claim 6, wherein the third wire is flexed in an intermediate portion thereof.

21. A system for controlling a vehicular engine operation, comprising:
(a) first means for electronically controlling a vehicular engine driving force adjusting mechanism associated with the engine in accordance with a first operating variable of a vehicular accelerator which corresponds to a desired parameter of the engine driving force mechanism adjusting and for determining a target parameter according to the first operating variable of the accelerator, so that a present parameter of the driving force adjustment mechanism coincides with the target parameter determined according to the first operating variable;
(b) second means for automatically controlling the parameter of the engine driving force adjusting mechanism in response to a command to set current vehicle speed to a desired cruise speed without operation of the accelerator so that the parameter of the engine driving force adjusting mechanism coincides with a second operating variable which corresponds to the set cruise speed and the vehicle speed is maintained at the desired cruise speed; and
(c) third means for preventing a further increase of the engine driving force adjusting parameter of the engine driving force adjusting mechanism which would result in the parameter exceeding both of the first and second operating variables.

22. A system as set forth in claim 21, wherein the third means limits a maximum engine driving force adjusting parameter of the engine driving force adjusting mechanism according to either of the first and second operating variables which is larger than the other.

23. A system as set forth in claim 22, wherein the first means comprises:
(a) fourth means for detecting either of the first and second input operating variables and outputting a first signal indicative thereof;
(b) fifth means for detecting a slip occurrence of vehicular tire wheels and outputting a second signal indicative thereof;
(c) sixth means for detecting the target parameter of the engine driving force adjusting mechanism and outputting a third signal indicative thereof;
(d) seventh means for deriving the target parameter of the engine driving force adjusting mechanism on the basis of the first, second, and third signals;
(e) eighth means for actuating the engine driving force adjusting mechanism so that the actual parameter of the engine driving force adjusting mechanism coincides with the target parameter.

24. A system as set forth in claim 23, wherein the fourth means detects the second input operating variable of the second means when the second means is operating and the accelerator is not operated.

25. A system as set forth in claim 23, wherein the fourth means detects the first operating variable when the second means is not operating and the accelerator is operating.

26. A system as set forth in claim 24, wherein the third means includes ninth means for selecting and outputting either of the first and second operating variables which is larger in magnitude; a limiter for limiting said maximum engine driving force adjusting parameter of the engine driving force adjusting mechanism; tenth means responsive to the selected operating variable by the ninth means for actuating the limiter to a position of said maximum engine driving force adjusting parameter corresponding to the selected operating variable; and eleventh means for holding the limiter at said position against an actuating force derived from the eighth means.

27. A system as set forth in claim 26, wherein the engine driving force adjusting mechanism comprises an engine throttle valve installed in an intake air passage of the vehicular engine and the engine speed adjusting parameter is an opening angle of the throttle valve.

28. A system for controlling a vehicular engine operation, comprising:
   (a) first means for electronically controlling a vehicular engine driving force adjusting mechanism in accordance with a first operating variable of an engine driving force adjusting parameter of the engine driving force adjusting mechanism derived from an operation of a vehicular accelerator;
   (b) second means for automatically controlling the vehicular engine driving force adjusting mechanism in accordance with a second operating variable of the engine driving force adjusting mechanism in accordance with a second operating variable of the engine driving force adjusting parameter; and
   (c) third means for limiting an increase of the engine driving force adjusting parameter so as to prevent same from exceeding both of the first and second operating variables so as to prevent the engine speed from being increased exceeding a value limited by said first and second operating variables.

29. A system for controlling a vehicular engine operation, comprising:
   (a) an operating variable selection mechanism for selecting and outputting one of a plurality of operating variables whose value is greater in magnitude, said operating variables being derived from an accelerator and an actuator of a vehicle speed automatically controlling system;
   (b) an accelerator sensor responsive to a command from the operating variable selecting mechanism for detecting the selected operating variable;
   (c) a throttle actuator for driving a vehicular engine throttle valve to change its angular displacement;
   (d) a throttle controlling unit for controlling the throttle actuator in a direction in which the opening angle of the throttle valve coincides with a target opening angle determined according to the operating variable detected by the accelerator sensor;
   (e) a throttle opening angle limiter for limiting a maximum opening angle of the throttle valve;
   (f) an opening angle limiter driving mechanism responsive to the command from the operating variable selection mechanism for driving the limiter to a set angular position corresponding to the selected operating variable corresponding to the selected operating variable by the operating variable selection mechanism; and
   (g) a limiter holding mechanism for holding the limiter against a driving force of the throttle actuator at the set angular position corresponding to the selected operating variable by the operating variable selection mechanism.

30. A method for controlling a vehicular engine operation, comprising the steps of:
   (a) selecting one of a plurality of operating variables which is greater in magnitude than any other operating variables, said operating variables including first and second operating variables which are derived from a displacement of an accelerator by a vehicle driver and from an automatic vehicle speed cruising controlling system;
   (b) setting a limiter, provided for limiting a maximum opening angle of a vehicular engine throttle valve installed in an intake air passage to an angularly displacable position of the throttle valve, to correspond to the selected operating variable,
   (c) detecting the operating variable selected in the step (a); and
   (d) actuating the throttle valve to open at a target opening angle determined according to the selected operating variable so that the present opening angle detected in the step (c) coincides with the target opening angle.

* * * * *